3,301,774
CONDUCTING CHEMICAL REACTIONS BY MEANS OF HIGH ENERGY IONIZING RADIATION
Robert R. Hentz, Pennington, N.J., assignor to Mobil Oil Corporation, a corporation of New York
No Drawing. Filed Aug. 1, 1962, Ser. No. 213,880
1 Claim. (Cl. 204—158)

This invention relates to a method of carrying out chemical reactions by means of high energy ionizing radiation.

Heretofore, chemical reactions have been carried out by irradiating the reactants directly, either in the presence or absence of solid contact material, but these procedures have tended to give rise to a multiplicity of reactions and in turn to diverse products, there being little or no selectivity. In other procedures, the irradiation of catalysts has been attempted with the object of enhancing their catalytic activity, and the resulting catalysts have then been used to catalyze reactions, but the conditions for the latter have of necessity been restricted to those under which the reactions are thermodynamically allowed.

This invention contemplates a method of carrying out chemical reactions comprising irradiating a solid contact material of high surface area with high energy ionizing radiation and in the absence of chemical reactants, then ceasing the irradiation, and thereafter bringing the chemical reactants into contact with the irradiated solids. It has been found, as a result of the irradiation, that sufficient energy is stored in the solids to effect the chemical conversion of the reactants.

The method has the advantage of increased selectivity over prior methods of radiation chemistry. It is operative not only for reactions that are thermodynamically allowed, but also for those which are thermodynamically forbidden, and while direct irradiation of reactants may also enable these types of reactions to proceed, the invention affords the use of considerably less drastic conditions and avoids undesirable side reactions. Thermodynamically forbidden reactions can be made to proceed at low temperatures by means of the invention, whereas irradiated catalysts would require higher temperatures such that their radiation-induced catalytic activity is liable to be rapidly destroyed.

Considering the invention in greater detail, suitable contact solids which may be irradiated and then used to promote a chemical reaction are those of high surface area in which states or centers of excitation of sufficiently long lifetime at some temperature may be generated. Specific solids include silica, silica gel, alumina, silica-alumina, oxides of calcium, barium, nickel, iron, and the like. Gel-type solids are useful, as obtained by drying hydrated oxides such as alumina, silica, titania, zirconia, magnesia and zinc aluminate. Also useful are the zeolites, both natural and synthetic, and including those zeolites which act as molecular sieves, having pores of uniform and generally very small size, say about 5 to 20 angstroms. Examples are chabazite and analcite, although there are many others, all of which are conventional. Ion exchange forms of zeolites are suitable. Other useful solids are siliceous earths such as diatomaceous earth, infusorial earth and kieselguhr; natural clays and clay-like materials such as kaolin and montmorillonite clays, bentonite, Fuller's earth, Superfiltrol, bauxite and Porocel; porous ceramic materials such as unglazed porcelain; aluminum silicate selective adsorbents such as calcium aluminum silicate; chamotte; asbestos; pumice; talc; activated carbon, bone char, charcoal, graphite; hydrosilicates, particularly those of aluminum. In general, the solid is an inorganic material, this term being employed in a sense sufficiently broad to cover activated carbon, graphite, charcoal and bone chars which are essentially carbon, even though in some cases they may contain small amounts of hydrogen.

The preferred solids are highly porous and have a surface area greater than 50 square meters per gram. More generally, the surface area may vary from 1 square meter per gram to any desired upper limit; usually it may range from 1 to 700, and preferably from 50 to 300 or 400 square meters per gram. As is known, these high surface areas are the result of an internal effect, rather than merely the state of subdivision, and more particularly arise from the presence in the solids of numerous pores or micropores having radii in the range of 3 or 4 angstroms to 100 microns. The pore volume is about 5 to 70%, preferably 30 to 50%, of the solids, and usually is greater than 0.2 cc. per gram. These properties of porosity and surface area may be obtained by means of conventional processing of the solids, such as calcining, chemical treatment, controlled precipitation rate and the like. It is desirable to remove adsorbed moisture from the solids prior to use.

In this connection, the utility of the solids is not affected by conventional pretreatments, such as the foregoing, and including heating for lengthy periods in oxidizing or reducing atmospheres.

High energy ionizing radiation of any type and from any suitable source may be used to irradiate, provided that it is sufficiently energetic and penetrating as to be able to generate states of excitation in the solids. Such radiation is intended to embrace both ionizing particle radiation and ionizing electromagnetic radiation; the former includes accelerated electrons, nuclear particles like protons, fast neutrons, alpha and beta particles, deuterons, fission fragments, and the like; and the latter includes gamma rays and X-rays. As ultraviolet and visible light are capable of producing excitation states in some solids, they may also be employed. Gamma rays are a convenient and practical penetrating radiation.

The foregoing types of radiation may be obtained from various sources, including natural radioactive materials, which emit alpha, beta, and gamma radiation; from nuclear fission by-products of processes in which atomic power is generated, those by-products including elements having atomic numbers ranging from 30 to 63; from materials made radioactive by exposure to neutron radiation, such as cobalt-60, cesium-37, sodium-24, manganese-56, gadolinium-72, lanthanum-140, etc.; from operating nuclear reactor. The charged particles may be brought to high energy levels by acceleration in devices like cathode ray tubes, Van de Graaff generators, betatrons, synchrotrons, cyclotrons, and electron accelerators. High energy X-ray machines are a source of X-rays.

A practically useful energy level for the foregoing types of radiation is 1 mev. although the level may range from 1 kev. to 20 or 30 mev. It will be understood that the invention is not dependent on the energy level of the radiation, which may be as low as is effective and as high as desired.

The radiation dose applied to the solid is variable, ranging from that amount which, during use of the irradiated solid, will produce a chemical conversion, to any desired greater amount. It is believed that with some solids, at least, saturation may occur such that further increases in dose do not result in further excitation or energy storage but, rather, in wasted energy; with these solids, therefore, the upper dose limit is simply a matter of economy. Illustrative doses may range from 0.0001 to 1,000, preferably 0.01 to 100 megarads.

The invention is independent of the rate of application of radiation to the solids, so that the dosage rate is a matter of convenience. Generally, lower rates require longer times and vice versa. As an example, a useful dose rate is about 1 megarad/hour. This value may be increased or decreased by several orders of magnitude with corresponding changes in the time of irradiation. A typical range is 0.1 to 10 megarads/hour, and a more general range is 0.01 to 1,000,000 megarads/hour.

Irradiation of the solids can be done at normal temperatures. There is no lower temperature limit, although the upper limit should be chosen to preserve the lifetime of the states of excitation of the solids. For most solids a safe upper temperature during irradiation is in the range of 100 to 300° C. Irradiation is preferably done in an inert atmosphere, i.e., in a vacuum or in the presence of an atmosphere to which energy transfer does not take place or takes place only very slowly. The foregoing temperature considerations apply to the storage and use of the irradiated solids.

After irradiation of some solids, a change in color of the solids may sometimes be observed. This is evidence of the creation of excited states which absorb in the visible part of the spectrum; these particular excited states (color centers) may or may not be the ones responsible for promotion of a desired chemical reaction.

The lifetime of the states of excitation of the irradiated solids is at least greater than 0.1 sec., and generally may extend to infinity. Usually it is of the order of several months or years at room temperature.

Utilization of the irradiated solids to promote a chemical reaction may take place at any convenient time after cessation of irradiation. Thus, it may be done immediately, or within a few tenths of a second following cessation, as in a continuously moving system where the solid moves from the point of irradiation to the point of use, or it may be done weeks or months later. It is accomplished by bringing the reactants into contact with the solid at any appropriate temperature, usually room temperature, and for a time sufficient to remove all of the stored energy from the solid. In many cases, transfer of energy to the reactants is essentially instantaneous. Such transfer depends on the rates of diffusion of reactant and product into and out of the micropores of the solids, and on the rate of energy transfer. The diffusion rates may be increased by reducing the particle size of the microporous solids. The products and any unchanged reactants are removed from the solid and subjected to conventional separation procedures. The act of chemical conversion destroys the ability of the solid to promote further conversions unless it is again irradiated. The solid is therefore treated, as by heating the same in the presence or absence of air and/or by chemical treatment, to remove any adherent by-products like heavy polymeric materials, carbon, and the like, after which it may or may not be conditioned, as by heating, evacuation, etc., and then subjected to irradiation as before.

A cyclic process may thus be employed comprising irradiating the solid, then contacting it with chemical reactants to effect a rection, removing the chemical product, cleaning up and restoring the solid to its original condition, then reusing the solid by irradiating the same, etc.

The irradiated solids are useful for promoting a wide variety of chemical reactions. By appropriate combinations of solids and reactants, a measure of selectivity may be obtained. The selectivity may be greatly increased by choosing as the solid for a particular reaction a material which conventionally is a catalyst for the reaction, it being only necessary that such material shall be capable of irradiation, and of subsequently transferring the stored energy to chemical reactants. It will be understood that in the energy transfer step, the material does not act as a catalyst but as an irradiated solid, as described. Thus, a catalyst influences a reaction only under conditions which are thermodynamically favorable to it, but an irradiated solid may promote a reaction under conditions which are thermodynamically unfavorable to it. In the foregoing way, reactions such as alkylation, aromatization, cracking, dealkylation, dearomatization, desulfurization, hydrogenation, isomerization, polymerization, and the like may be carried out, using as the irradiated solid a material which is a conventional catalyst for the reaction, and employing conditions under which the reaction, as conventionally performed, is thermodynamically forbidden.

Illustrative materials of the foregoing type which are useful in the invention are the following, an indication being given of a reaction conventionally catalyzed by the material: mixtures of silica with alumina, zirconia or magnesia, or composites of silica-alumina with magnesia, thoria, or zirconia, for the catalytic cracking of hydrocarbons; chromia or molybdena on alumina, or cogelled chromia-alumina or molybdena-alumina for hydrogenation, dehydrogenation, and reforming of hydrocarbons; platinum or nickel on alumina containing small amounts of halogens or on silica gel for isomerization of hydrocarbons; chromia on alumina or on silica-alumina gels for dealkylation of alkyl aromatic hydrocarbons; mixtures of alumina, tungstic acid and ferric oxide (or zinc oxide) for various dehydration or hydration reactions, that is, conversion of alcohols to olefins or the reverse; a mixture of the oxides of copper and tungsten on charcoal for the hydration of ethylene; mixtures of iron oxide with chromia and potassium oxide on alumina for dehydrogenation of ethyl benzene to styrene; mixtures of iron oxides with alumina and potassium oxide on silica gel, usually partially reduced by low temperature gaseous reduction, for the Fischer Tropsch or ammonia synthesis; vanadium oxide on asbestos for oxidations such as that of naphthalene to phthalic anhydride, or of sulfur dioxide to trioxide; sulfides of tungsten, molybdenum and of iron group metals on alumina for the hydrogenation of coaltar, heavy oil or sulfur-containing material in general; general; nickel on alumina or silica for conversion of hydrogen and carbon monoxide to low molecular weight gaseous paraffins; mixtures of copper with ammonia with or without pumice or kieselguhr for hydrogenation of carbonyl- and carboxyl-containing compounds to alcohols; mixtures of copper and zinc on silica or alumina for the dehydrogenation of alcohols; silver on pumice for dehydrogenation of alcohols, such as the conversion of methanol to formaldehyde; and palladium on bone-char for reduction of ketones.

It will be understood that the irradiated solid can also promote reactions under conditions thermodynamically favorable to them, as well as under thermodynamically unfavorable conditions.

The invention may be illustrated by the following examples.

*Example 1*

Microporous silica-alumina containing 10% alumina was used in the form of beads 2–6 mm. in diameter; surface area=400 m.$^2$/g.; pore volume=0.43 ml./g.; particle density=1.15 g./ml. Prior to use, the solid was placed in a muffle furnace at 550° C. for 20–70 hr. and then stored in a desiccator containing anhydrous magnesium perchlorate. An amount of this solid equal to 31.7 g. was weighed into a cylindrical pyrex reaction cell about 3 cm. in internal diameter, 9 cm. in length, and 60 ml. in volume. The cell was equipped with a breakoff seal in an 8 mm. tube projecting from the top, and a perpendicular 8 mm. side tube was connected below the breakoff seal. The cell with solid was joined to a high-vacuum line by means of this side tube where it was heated at about 450° C. in a furnace and maintained at a pressure less than 10$^{-5}$ mm. of mercury for about 22 hours. The cell was allowed to come to room temperature while remaining attached to the vacuum line and was removed from the vacuum line by sealing off under vacuum at the side arm. The solid in the cell was then irradiated at a temperature of 36° C. with cobalt-60 gamma rays at a dose rate of $7.34 \times 10^{19}$ e.v./g./hr. (1.17 megarads/hr.) for 2.33 hr. to a total dose of $5.42 \times 10^{21}$ e.v. After irradiation the solid was a very dark, essentially black, color. The cell was sealed on to the vacuum line above the breakoff seal after insertion of a little breaker.

An amount equal to 0.203 g. of isopropylbenzene (Eastman-Kodak 1481, which was purified by fractional distillation and within two days prior to use by passage of 20 ml. through 10 ml. of Alcoa F–20 alumina in a 50 ml. buret with Teflon stopcock at rate of about 2 ml./min.—for removal of the hydroperoxide), was weighed into a tube which was attached by means of a standard taper joint to the vacuum line. The isopropylbenzene was frozen in liquid nitrogen and air was removed by opening a stopcock to the vacuum line. After air removal, the isopropylbenzene was distilled by use of liquid nitrogen into a tube on the vacuum line with a sodium mirror for removal of any traces of residual moisture. The liquid was allowed to stand five minutes in this tube; it was then frozen in liquid nitrogen and pumped on; it was again isolated from the line by a stopcock, liquefied and the process was repeated two more times. Finally, liquid nitrogen was placed on the cell with irradiated solid, the breakoff seal was broken, and the isopropylbenzene was distilled onto the solid which had been at room temperature for two hours. The cell with contents was then brought to room temperature.

The uppermost beads was observed to be partially decolorized. The beads appeared white on the periphery first with dark centers and decolorization proceeded inward to the bead centers which suggests that decolorization is dependent on isopropylbenzene diffusion into the beads rather than long-range migration of the excitations represented by the color centers. The decolorization proceeded down the length of the beads in the cell as if by diffusion of isopropylbenzene and appeared to be essentially complete in 3–4 hours. Cell and contents stood overnight and products were removed. Gas products were separated and measured by passage through a trap at $-118°$ C. into a collecting and measuring system. The amounts were too small for analysis of constituent gases. Liquid products with unreacted isopropylbenzene were removed over a four-hour period by maintaining the cell with solid in a boiling water bath near 100° C. while an adjacent trap was kept at liquid nitrogen temperature. The liquid distilled from the solid into the trap. The procedure was found to give quantitative recovery of benzene and recovery of most of the unreacted isopropylbenzene without decomposition. The recovered liquid was analyzed by gas chromatography and the only product found in measurable amount was benzene. Yields based on energy absorbed in the solid were as follows: G (total gas) = 0.011, G (benzene) = 0.42, G being the number of molecules per 100 electron volts.

*Example 2*

The work of Example 1 was repeated but the cell with irradiated, darkened solid was kept in liquid nitrogen from the cessation of irradiation to introduction of isopropylbenzene. G (total gas) = 0.012, G (benzene) = 0.42.

*Example 3*

After product recovery in the experiment of Example 2, the cell with energy-depleted solid was opened to the vacuum line and pumped overnight at $10^{-5}$ to $10^{-6}$ mm. of mercury. Another 0.2 g. portion of pure isopropylbenzene was introduced and allowed to stand overnight on the solid. The results were identical with those of blank experiments, i.e., using nonirradiated solid; there was no detectable product formation or isopropylbenzene decomposition.

*Example 4*

In another experiment, the isopropylbenzene was simply allowed to distill onto irradiated solid which was at room temperature (this process required only 10 minutes). The decolorization proceeded much more uniformly over the whole solid in this case although the rate of decolorization was still slightly more rapid in the uppermost beads than in the lowest. Complete decolorization required about 3 hours. G (total gas) = 0.009; G (benzene) = 0.43.

*Example 5*

An experiment was performed in which the dark, irradiated solid was first maintained at 100° C. for four hours. The solid remained quite dark; however, a change in shade from a rather dark black to a dark gray was recorded. It was felt that a slight bleaching had occurred. Isopropylbenzene was then introduced as in Example 4, and decolorization proceeded in the same fashion. G (total gas) = 0.001; G (benzene) = 0.33. Thus, a 21% decrease in benzene yield and a 10-fold decrease in gas yield occurred as a result of the heating at 100° C.

*Example 6*

Irradiation of liquid isopropylbenzene at 36° C. in the absence of solid gave G (total gas) = 0.3 and G (benzene) = 0.05 as well as other liquid products with yields comparable to that of benzene.

*Example 7*

Solid was irradiated as described in Example 1 and stored under vacuum in the reaction cell for one year. After a year's storage, coloration of the solid had definitely decreased to a shade judged roughly equivalent to a dose one-fourth of that originally received and G ($H_2$) had decreased from 0.011 to 0.0045; however, there was no decrease in G (benzene), which was 0.41.

Considering the examples for a moment, it may be apparent from Example 3 that after contact of the solid with isopropylbenzene to form benzene, the ability of the solid to promote any conversion to benzene of a second portion of isopropylbenzene is destroyed. Thus, benzene formation occurs concomitant with and as a result of de-excitation of the solid. Energy transfer and not catalysis is involved.

Example 5 shows that heating of the solid for 4 hours at 100° C. causes a 21% de-excitation of states responsible for benzene formation. Higher temperatures would probably destroy the stored energy more rapidly.

In connection with Example 6, a comparison of the yields obtained there with those of Example 1 shows that when the radiation energy is first absorbed in the solid and subsequently transferred to isopropylbenzene, the stored energy is used at least 8 times more efficiently for benzene formation than the energy absorbed directly in the liquid. The 30-fold lower gas yield in presence of the solid, the absence of other recovered liquid products, and the data on conversion of decomposed isopropylbenzene to benzene all suggest that the solid considerably enhances the selectivity of isopropylbenzene decomposition to benzene.

Example 7 illustrates the long period over which energy may be stored in the solid at room temperature; and it further shows that the excited states which are responsible for color, although probably associated with hydrogen formation, are apparently not the states responsible for benzene formation.

It is to be noted particularly that conversion of isopropylbenzene to benzene and propylene at the temperature of these experiments is thermodynamically forbidden; the equilibrium constant overwhelmingly favors isopropylbenzene relative to products. It is apparent that catalysts cannot promote appreciable conversion of isopropylbenzene to benzene at room temperature as was accomplished by these procedures. It is to be noted further that the solid used is a conventional catalyst for isopropylbenzene dealkylation to benzene and promotes this reaction at the higher temperatures at which it is thermodynamically allowed. Thus, a solid which is a conventional catalyst may direct its stored energy into that reaction for which it has conventional catalytic properties, making possible a very selective utilization of high energy radiation to promote a reaction using conditions under which that reaction is thermodynamically forbidden.

As indicated, the role of the irradiated solids for promoting chemical reactions is not a catalytic one because the solids promote reactions under thermodynamically unfavorable as well as favorable conditions, whereas catalysts influence reactions only under thermodynamically favorable conditions. Under unfavorable conditions, such as a reaction at constant temperature and constant pressure for which the free energy change is positive, catalysts are without effect.

The irradiated solids alter the position of equilibrium of a reaction, whereas catalysts alter only the rate of approach to equilibrium.

Furthermore, the irradiated solids act by storing and then releasing energy; and the lifetime of activity is dependent on their use, i.e., after a single use the energy is depleted and must be restored. Catalysts, on the other hand, do not alternatively store and release energy, and the activity is independent of use; in other words, the catalytic sites are not destroyed by use.

Summarizing the invention briefly, particularly its advantages, it may now be apparent that it provides a convenient procedure of storing energy and using the same at a later and perhaps more convenient time. It is possible not only to promote a reaction using experimental conditions under which the reaction is thermodynamically allowed, but also to promote a reaction under conditions at which it is thermodynamically forbidden. The latter conditions may be considerably less drastic than the former, and may enable undesirable side reactions to be avoided. In some cases involving the use of catalysts, the attainment of thermodynamically favorable conditions may be practically impossible owing to the instability of a reactant or product.

The invention has a unique and considerable advantage over processes which involve the induction or enhancement of catalytic activity in a catalyst by irradiation. Such solids can only be used to promote a reaction using conditions under which the reaction is thermodynamically allowed. For most reactions of interest such conditions require a temperature at which the radiation-induced catalytic activity is rapidly destroyed. On the other hand, and as demonstrated by the invention, a solid in which energy is stored in states of excitation may transfer that energy to promote a chemical reaction using conditions under which the reaction is not thermodynamically allowed; thus, the reaction can be carried out at a low temperature at which the states of excitation are very stable, essentially of infinite lifetime.

By comparison with direct irradiation of a reactant, i.e., in the presence or absence of a solid, the present method is more selective. In direct irradiation, a multiplicity of reactions takes place with little or no selectivity of product formation, whereas in the present method, the applied radiation is stored in the solid at energy levels which are low by comparison with the incident radiation. This stored energy, and the nature of the solid, may singly or in combination promote particular reactions with greater selectivity.

In addition to the advantage of selectivity, some irradiated solids may be able to promote reactions for which no satisfactory process, thermal or catalytic, exists, such as the conversion of ammonia to hydrazine.

After irradiation of the solid according to the preferred form of the invention, i.e., with gamma rays, which do not induce radioactivity, the solid may be employed in conventional chemical reactors without encountering special design problems as in direct irradiation systems.

It will be understood that the invention is capable of obvious variations without departing from its scope.

In the light of the foregoing descriptions, the following is claimed.

A method of carrying out a carbon-to-carbon bond-breaking radiation chemical reaction by energy transfer comprising irradiating a porous subdivided inorganic solid material in the absence of a chemical reactant to produce states of excitation therein whereby energy is stored in said material, said radiation being sufficiently energetic and penetrating as to be capable of producing said states of excitation, said solid material being irradiatable to form said states and being capable of storing energy in said states and of subsequently transferring it therefrom, said solid material being further characterized by having a surface area ranging from 1 to 700 sq. m./g., a pore volume of 5 to 70% thereof, and by having pore radii in the range of 3 Angstroms to 100 microns, then ceasing the irradiation of the solid material, then after a time greater than 0.1 second contacting the solid material with at least one fluid hydrocarbon chemical reactant for a time sufficient to enable said stored energy to be transferred to said reactant so that the latter undergoes a chemical reaction, thereby depleting the solid material of its said stored energy, said reaction involving the breaking of carbon-to-carbon bonds of said reactant and resulting in formation of a hydrocarbon product having fewer carbon atoms than said reactant, and removing said product from the solid material, said method being useful to carry out both thermodynamically allowable and thermodynamically forbidden chemical reactions.

References Cited by the Examiner

UNITED STATES PATENTS

| | | | |
|---|---|---|---|
| 2,905,608 | 9/1959 | Noddings et al. | 204—158 |
| 2,940,912 | 6/1960 | McKusick | 204—158 |
| 2,951,796 | 9/1960 | Ruskin | 204—158 |
| 2,955,997 | 10/1960 | Allen et al. | 204—158 |
| 3,002,911 | 10/1961 | Sutherland et al. | 204—154 |
| 3,012,953 | 12/1961 | Greenwald et al. | 204—158 |
| 3,051,737 | 8/1962 | Gibson | 204—158 |
| 3,158,560 | 11/1964 | Caffrey | 204—162 |

JOHN H. MACK, *Primary Examiner.*

MURRAY TILLMAN, WINSTON A. DOUGLAS,
*Examiners.*

H. S. WILLIAMS, *Assistant Examiner.*